Patented June 5, 1934

1,961,784

UNITED STATES PATENT OFFICE

1,961,784

REGENERATIVE HEAT CYCLE

Ralph C. Roe, Englewood, N. J., assignor of one-half to Stephen W. Borden, Summit, N. J.

Application January 12, 1931, Serial No. 508,069

10 Claims. (Cl. 60—38)

This invention pertains to improvements in regenerative heat cycles and more particularly the heat cycle involved in a steam turbine power plant.

The object of the invention is to reclaim heat units, ordinarily rejected to condensing water, and also to extract heat from a source of water or fluid and to utilize the heat in a steam turbine or otherwise.

Figure 1:
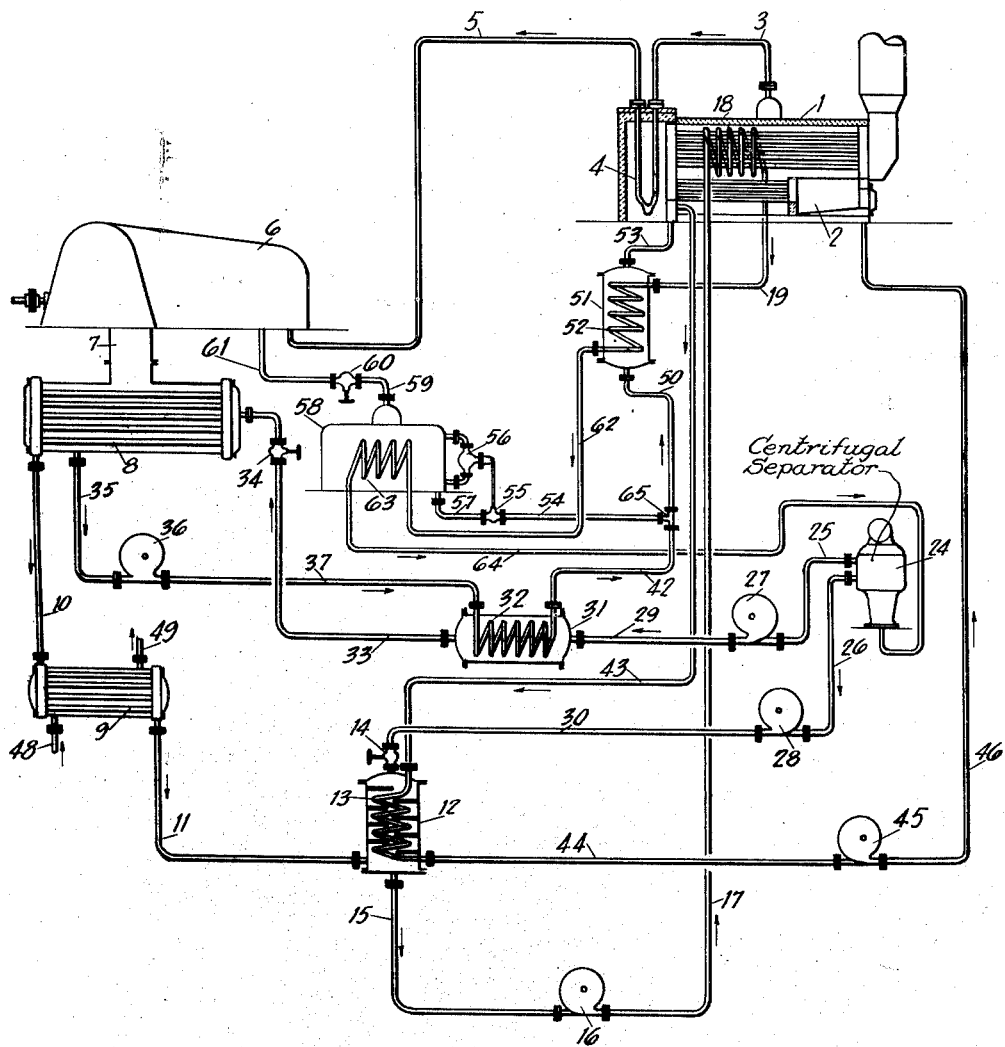
Figure 2:
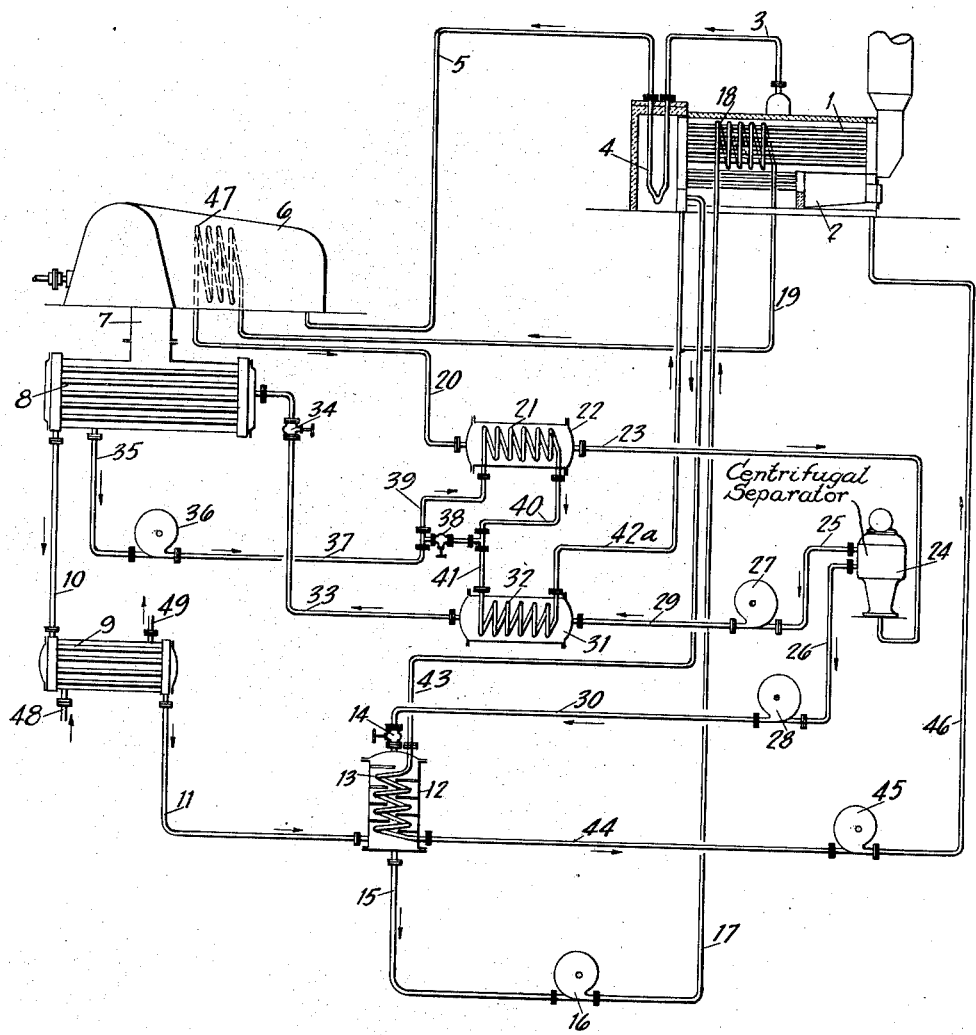

In the drawings, which are schematic, Fig. 1 illustrates a steam turbine plant utilizing my invention, one element of the system being the steam generator 58. Fig. 2 is a modification wherein the steam generator 58 is replaced by a reheating coil 47 in the turbine 6. Like numerals refer to like parts in both figures.

In the drawings: 1 is a steam boiler, 2 the boiler furnace, 3 a conduit, 4 a steam superheater, 5 a conduit, 6 a steam turbine or other prime mover, 7 exhaust steam connection to a condenser evaporator 8, 9 a water-heat absorber, 10 and 11 conduits, 12 a vapor absorber, 13 a heat absorbing coil, 14 a reducing valve, 15 a conduit, 16 a pump, 17 a conduit, 18 a heating coil, 19 and 20 conduits, 21 a heat absorbing coil, 22 heat exchanger, 23 a conduit, 24 a mechanical separator, 25 and 26 conduits, 27 and 28 pumps, 29 and 30 conduits, 31 a heat exchanger, 32 a heat absorbing coil, 33 a conduit, 34 a reducing valve, 35 a conduit, 36 a pump, 37 a conduit, 38 a by-pass valve, 39, 40, 41, 42, 42a, 43 and 44 conduits, 45 a pump, 46 a conduit, 47 a steam reheating coil, 48 a water inlet, 49 a water outlet, 50 a conduit, 51 a heat exchanger, 52 a heating coil, 53 and 54 conduits, 55 a float operated valve, 56 a float chamber, 57 a conduit, 58 a steam generator, 59 a conduit, 60 a steam control valve, 61 and 62 conduits, 63 a heater coil, 64 a conduit and 65 a T.

The mechanical separator, 24, may be any type suitable for the purpose and may be operated either at atmospheric pressure or above or below atmospheric pressure. A suitable separator is described in United States Patent #1,634,246 and machines of this type are commercially available at this time.

The operation of the steam end of the plant in Fig. 1 is as follows: Steam is generated in boiler 1, partly by heat supplied by furnace 2, passes through superheater 4 to turbine 6 from which it exhausts into condenser evaporator 8. Steam is generated also in generator 58 and passes into the turbine at a suitable pressure point as later explained. The condensate from condenser evaporator 8 is pumped by pump 36 through coil 32 to the T connection 65 where it divides, a part flowing through conduit 54 to steam generator 58 and the balance flowing through conduit 50 to steam boiler 1. In Fig. 2 steam is generated in boiler 1, passes through superheater 4 to turbine 6, then through exhaust connection to condenser evaporator 8. The condensate from condenser evaporator 8 is pumped by pump 36 through conduit 37, thence partly through heating coil 21 and partly through by-pass valve 38 to heating coil 32 and thence by way of conduit 42a back to boiler 1.

The terms used herein are to be understood to have the following meanings.

*Binary fluid.*—An absorptive, thermal-binary fluid consisting of two liquids in certain normal proportions, one of which has a lower boiling point, at any pressure, than the other and the latter liquid having the property of absorbing, under certain conditions, vapor of the former liquid.

*Light liquid.*—That liquid of a binary fluid which has the lower boiling point.

*Heavy liquid.*—That liquid of a binary fluid which has the higher boiling point.

Either or both liquids may be a solution of two or more substances.

The general principles of absorption refrigeration may be found in such standard reference works as Kent's and Mark's hand books of mechanical engineering and in "Refrigeration" by Moyer and Fittz, 1928. Therein will be found a description of the operation of absorbers by means of which heat is transferred from a substance at one temperature to a substance which is at a higher temperature, as well as drawings and descriptions of the operation of binary fluid refrigeration systems.

The reclamation of heat from the turbine exhaust is brought about by condensing steam in condenser evaporator 8 by evaporating therein the light liquid of a binary fluid, the vapor thereof being later absorbed by the heavy liquid of the binary fluid thereby giving up in "heat of absorption" the major part of the heat absorbed from the steam. The two liquids, now combined into a binary fluid by the absorption process, are later separated into light and heavy liquids and the cycle repeated. In order to understand the action which takes place, it is necessary to have a clear comprehension of the characteristics of binary fluids.

There are three distinct classes of binary fluids. In one class the liquids form a true chemical combination and can be disassociated only by means of heat. In a second class the mixture is not a chemical combination but a mechanical mixture in which the constituent parts have a strong affinity for each other forming a true solution with each other which affinity is not easily overcome even though the different constituents have different specific gravities. The third class of binary fluids is similar to the second in that they are purely mechanical mixtures but the constituent parts do not have a strong affinity for each other and therefore do not form a mixture of the same intimacy as that of the second class.

There are a number of solutions which change from the second to the third class with changes in temperature or pressure and these are the solutions which I prefer for use in my regenerative cycle. One effect of coils 47, 52 and 63 and heat exchanger 21 is to change the characteristics of the solution from those of an intimate relation to those of a non-intimate relation, which change facilitates separation by centrifugal force and other means.

The absorber 12 functions best with a binary fluid of the second class and the fluids used are of the second class when in the absorber but after giving up heat, as in coils 47, 52 and 63 and heat exchanger 21, they have been changed to fluids of the third class and therefore made more suitable for separating purposes.

The change in the fluid from the second to the third state may be brought about by cooling the fluid to a point where one of the constituents is in the preliminary stages of congealing when the fluid is in suitable condition for separation. The amount of heat that must be taken away from the liquid, in order to produce the proper conditions for separator operation, depends upon the particular liquid used but in any case it is desirable to have the fluid enter the separator at a fairly definite temperature.

The method of reclaiming the heat units from the exhaust steam is as follows. Referring to Fig. 1: conduit 25 contains the light liquid of a binary fluid which has been separated in separator 24 and conduit 26 contains the heavy liquid. The light liquid flows through pump 27, heat exchanger 31, where it is cooled, through conduit 33 and expansion valve 34 to condenser evaporator 8 where it is totally or partially vaporized by the exhaust steam and where it takes up heat from the exhaust steam producing condensation of the same. The vapor thus formed and any remaining un-vaporized liquid in condenser evaporator 8, passes through conduit 10, water-heat absorber 9 and conduit 11 to the vapor absorber 12. The heavy liquid enters absorber 12 from conduit 26, via pump 28 and reducing valve 14, said valve reducing the pressure to that of the vapor entering from conduit 11, and the vapor being brought into intimate contact with the liquid in absorber 12, is absorbed thereby thus forming a binary fluid which passes out of the absorber through conduit 15, pump 16 and conduit 17 to a heating coil 18 in boiler 1.

When the vapor is absorbed by the fluid in absorber 12, it gives up, in the form of heat of absorption, most of the heat which it absorbed from the steam in condenser evaporator 8 to the coil 13 from whence it is transferred to boiler 1 by means of water circulated through coil 13, conduit 44, pump 45 and conduits 46 and 43. The balance of the heat remains in the form of heat of liquid in the binary fluid which fluid, as previously stated, is conveyed to the heating coil 18 in the boiler where it gives up sufficient of its heat to the water in the boiler to reduce its temperature, as nearly as possible, to that of the water in the boiler. The binary fluid then passes on through coil 52, where it gives up further heat to the boiler feed water and then passes on to the heating coil 63 in steam generator 58 where sufficient heat is extracted therefrom to reduce its temperature to that desired for satisfactory operation of the separator, after which it flows through conduit 64 to separator 24 where it is separated into its two constituent liquids.

Referring to Fig. 2, the operation is the same as in Fig. 1 up to the point where the binary fluid passes through coil 18 in the boiler. After passing coil 18, the fluid flows through conduit 19 to coil 47 in turbine 6, where it is in heat exchange relation with the turbine steam, and where its temperature is reduced, after which it flows through conduit 20 and heat exchanger 22 to separator 24. In heat exchanger 22 heat is given up to the boiler feed water flowing through coil 21 and the amount of heat given up may be regulated by regulating the by-pass valve 38, which may be an automatically operated valve controlled by a thermostat in the conduit line 23 thus insuring the delivery of the fluid to separator 24 at a substantially constant and predetermined temperature.

The necessary temperature in steam generator 58 depends upon the particular binary fluid used and upon the pressure under which it is operating which in turn depends upon the head characteristics of pump 16. The desired temperature being arrived at from these factors, the appropriate temperature, and therefore the steam pressure, in steam generator 58 is determined and the generator is then connected to turbine 6 at a point where, with full load on the turbine, the steam pressure in turbine 6 will correspond with the determined steam pressure of generator 58. With reduced loads on the turbine, pressure in the turbine will decrease but the pressure in generator 58 may be maintained constant by automatically or otherwise adjusting valve 60 so as to limit the flow of steam from generator 58 to the turbine. The steam generator 58 of course is constructed of such size as may be necessary to extract from the binary fluid, via coil 63, such maximum amount of heat as may be necessary.

Heat exchanger 51 extracts from the binary fluid as much heat as it can and transfers it to the boiler where the steam temperature and pressure are higher than in steam generator 58. This exchanger is not essential but obviously improves the efficiency. The heat exchanger 31 transfers heat to the boiler feed water from the light liquid on its way to the condenser evaporator thereby cooling the light liquid and increasing its capacity for absorbing heat from the condenser evaporator and the water-heat absorber.

The power supplied to pump 16 reappears in the system in two forms. First in the form of increased pressure, which is later reclaimed when the pressure is reduced and second in the form of heat in the liquid in conduit 17, the amount of heat varying inversely as the efficiency of the pump. Since the temperature of the fluid in conduit 17 is higher than the vaporization point of the binary fluid, it is necessary to reduce its temperature and this is the function of the coil 18.

It is, of course, essential that the binary fluid be of a character which will operate properly in the absorber, that is, one in which the heavy liquid will absorb the vapor of the light liquid when the two are brought into contact at a suitable temperature and in the process will release heat of absorption. For the system shown in this particular application, it is further necessary that the mixture be a mechanical soluble mixture and not a chemical mixture since, in the latter case, the constituent parts may be separated only by the application of heat. A system in which a chemical mixture may be used is described in my co-pending application of even date, Serial No. 508,068.

For any binary fluid, as herein defined, there is a particular temperature above which the light liquid will be distilled off from the mixture and conversely, a particular temperature below which the vapor of the light liquid will be absorbed by the heavy liquid when they are brought into intimate contact, as in the absorber 12. It will be apparent that the temperature in coil 13 cannot be greater than this particular higher temperature since otherwise the temperature in absorber 12 would be too high to permit the absorbing process to function and the temperature, and therefore the pressure, in boiler 1 cannot be materially greater than the temperature in coil 13 from which it follows that the boiling point of the binary fluid, when in its richest state as for instance when in the bottom of the absorber, determines the temperature and therefore the pressure of the steam in boiler 1. The boiling point of the light liquid entering the condenser evaporator 8 must be low enough to produce the vacuum under which the turbine is to operate.

Those skilled in this art will understand that the details of the apparatus and the binary fluid used will vary according to the particular requirements attending the use of which the system is to be put, but for the purposes of illustration I shall refer to an apparatus shown in Fig. 1 of the accompanying drawings and describe the same with reference to the use of the following binary fluid. A heavy liquid consisting of 74% naphthalene ($C_{10}H_8$) and 26% medium fraction diphenyl oxide oil, and as a light liquid, benzene ($C_6H_6$). As the binary fluid leaves the absorber it consists of 7% light liquid and 93% heavy liquid.

In this particular binary fluid the heavy liquid starts to congeal at about 179 degrees Fahr. when under a pressure of 15.5 pounds absolute. At that point the affinity between the light and heavy liquids is very low and the fluid is in suitable condition for mechanical separation. As the temperature starts up the affinity increases. The temperature of the binary fluid as it enters separator 24 is the same as when leaving coil 63 and the temperature at this point may be regulated by regulating the pressure, and therefore the temperature, in generator 58 as more fully previously explained. The specific gravity of the light liquid, benzene, at 180 degrees Fahr. is approximately .781 and that of the heavy liquid approximately 1.11 or the specific gravities have a ratio of 1 to 1.42 which those skilled in the art will recognize as ample for satisfactory separation. For this particular case the pumps 27 and 28 are hardly necessary but for some fluids they are desirable to insure prompt removal of the liquids from the separator.

In the case described there is available a sufficient supply of waste hot water, at a temperature of 90 degrees Fahr., to furnish, via water-heat absorber 9, approximately 45 percent of the total heat utilized by the turbine, the balance being furnished by fuel burned in furnace 2.

The pressures and temperatures which will be developed in the various parts of the system will be as follows, no allowance being made for friction or radiation losses. The location numbers are the reference characters of Fig. 1. Temperatures are degrees Fahr. Pressures are lbs. absolute.

| Location | Pressure | Temperature | Location | Pressure | Temperature |
|---|---|---|---|---|---|
| 3 | 10.385 | 195 | 37 | 10.385 | 84 |
| 5 | 10.385 | 240 | 42 | 10.385 | 177.167 |
| 7 | .575 | 84 | 43, 44, and 46 | 10.385 | 195 |
| 10 and 11 | 1.93 | 79 | 48 | | 90 |
| 12 and 15 | 1.93 | 198 | 49 | | 85 |
| 17 | 15.5 | 198 | 53 | 10.385 | 194 |
| 19 | 15.5 | 196 | 59 | 7.2 | 178 |
| 25, 26, and 30 | 15.5 | 180 | 62 | 15.5 | 195.83 |
| 33 | 15.5 | 148 | 64 | 15.5 | 180 |

The light liquid leaves heater 31 at 15.5 lbs. and 148 degrees and expansion valve 34 reduces the pressure to 1.93 lbs. which results in the evaporation of sufficient light liquid to drop the temperature of the mass to 79 degrees.

The system here described, while of great value under any circumstances, is especially so for locations where no condensing water is available which includes many desirable locations near a source of fuel or other heat supply.

Since the power involved in the operation of pumps 16, 27, 28 and 45 reappears, for the most part, in the form of heat in the system, it is apparent that the reclamation cycle itself is highly efficient and that substantially all of the heat taken from the condenser evaporator 8 is returned to the steam turbine in the form of steam under pressure and the only heat which it is necessary to supply to the system, via furnace 2 or as later explained, via water-heat absorber 9, is that amount of heat which is actually converted by the turbine into power plus the usual radiation and other small losses. As is well known it is necessary, in the most efficient conventional condensing steam turbine plants, to supply to the system three or four times the amount of heat which the turbine actually converts into work, most of the excess heat being rejected to the condensing water.

It has been pointed out that any excess liquid, as well as the vapor generated, in condenser evaporator 8, flows through water-heat absorber 9. If a fluid be passed through absorber 9 via inlet 48 and exit 49 then, if such liquid has a temperature in excess of the boiling point of the cooling liquid or vapor flowing through 9, the excess liquid will be evaporated or the vapor will be further expanded and will take up heat from the liquid circulating therethrough. Heat may thus be drawn from any available fluid such as hot liquids growing out of process work or even hot gases may be utilized. In most cases, however, the available fluid will be water from natural sources such as the ocean, a lake, river or other stream or in other words, the same source of water which would otherwise, in present power plant practice, be used for condensing purposes. Since in a condensing plant, the water circulated through the steam condenser absorbs two to three times the amount of heat which the turbine itself converts into power, it is obvious that the water-heat absorber 9 need be only about one-third the size of a steam condenser for plants of equal capacity, if we reduce the water temperature only as many degrees as the steam condenser would increase it, which ordinarily is from five to fifteen degrees. The temperature of the water or other fluid, from which the heat is extracted, may be reduced to the point where it starts to freeze and may even be frozen to the point where it begins to interfere with the circulation through the water-heat absorber, which means that a part of the heat of fusion may be extracted therefrom. If the temperature of the water be fairly high to start with and it be reduced to the freezing point or perhaps partly frozen, we may then obtain a much larger number of B. t. u.'s per lb. of water flowing through water-heat absorber 9 than the conventional steam condenser takes up in its cooling water.

From the foregoing it becomes apparent that sufficient heat may be extracted from any body of water of suitable volume and temperature to actually operate the steam turbine without supplying any heat via furnace 2 or from any other source. The higher the temperature of the water, the more suitable it is for the purpose and, as already pointed out, the volume necessary is much less than that required for conventional steam plant condensing purposes.

While I have shown and described one embodiment of my invention in accordance with the patent statutes, it will be understood that my invention is capable of embodiment in a variety of forms of apparatus and that I am not limited to the specific arrangement or structural parts shown and described, but that the scope of invention is to be gauged by the accompanying claims taken in connection with the state of the prior art.

What I claim is:—

1. That improvement in the method of producing power by means of a steam prime mover receiving steam from a steam boiler and exhausting steam into a condenser evaporator; which consists in supplying to the condenser evaporator a supply of light liquid which liquid is one of a binary fluid, conveying from the condenser evaporator the vaporized light liquid to an absorber and bringing it therein into intimate contact with a portion of the heavy liquid of the binary fluid; conveying from the absorber to the steam boiler heat of absorption produced in the absorber by the absorption of the vapor by the liquid; conveying the binary fluid formed in the absorber, via cooling means, to a separator, for separation into its light and heavy liquids; conveying the light liquid, via a conduit and pressure reducing means, back to the condenser evaporator and conveying the heavy liquid, via a conduit and pressure reducing means, to the absorber.

2. A power plant which includes a steam prime mover; a boiler for supplying steam to the prime mover; a condenser evaporator receiving steam from the prime mover; a conduit line which includes a pump, for conducting the steam condensate from the condenser evaporator to the boiler; an absorber for absorbing vapor from the condenser evaporator, the absorber being arranged in heat exchange relation with the boiler; a separator adapted to separate a binary fluid into its two constituent fluids; a conduit line, which includes a pump and pressure reducing means, for conducting liquid from the separator to the absorber; a conduit line, which includes a pump and pressure reducing means, for conducting liquid from the separator to the condenser evaporator; and a conduit line, for conducting a binary fluid from the absorber to the separator, which conduit line includes a pump.

3. A power plant which includes a steam prime mover; a boiler for supplying steam to the prime mover; a condenser evaporator receiving steam from the prime mover; a conduit line which includes a pump, for conducting the steam condensate from the condenser evaporator to the boiler; an absorber for absorbing vapor from the condenser evaporator, the absorber being arranged in heat exchange relation with the boiler; a separator adapted to separate a binary fluid into its two constituent liquids; a conduit line, which includes a pump and pressure reducing means, for conducting liquid from the separator to the absorber; a conduit line, which includes a pump and pressure reducing means, for conducting liquid from the separator to the condenser evaporator; and a conduit line, for conducting a binary fluid from the absorber to the separator, which conduit line includes a pump and cooling means.

4. A power plant which includes a steam prime mover; a boiler for supplying steam to the prime mover; a condenser evaporator receiving steam from the prime mover; a conduit line which includes a pump, for conducting the steam condensate from the condenser evaporator to the boiler; an absorber for absorbing vapor from the condenser evaporator, the absorber being arranged in heat exchange relation with the boiler; a separator adapted to separate a binary fluid into its two constituent fluids; a conduit line, which includes a pump and pressure reducing means, for conducting liquid from the separator to the absorber; a conduit line, which includes a pump and pressure reducing means, for conducting liquid from the separator to the condenser evaporator; and a conduit line, for conducting a binary fluid from the absorber to the separator, which conduit line includes a pump, cooling means located in the boiler and cooling means located in the prime mover.

5. A power plant which includes a steam prime mover; a boiler for supplying steam to the prime mover; a condenser evaporator receiving steam from the prime mover; a conduit line which includes a pump, for conducting the steam condensate from the condenser evaporator to the boiler; an absorber for absorbing vapor from the condenser evaporator, the absorber being arranged in heat exchange relation with the boiler; a separator adapted to separate a binary fluid into its two constituent fluids; a conduit line, which includes a pump and pressure reducing means, for conducting liquid from the separator to the absorber; a conduit line, which includes a pump and pressure reducing means, for conducting liquid from the separator to the condenser evaporator; and a conduit line, for conducting a binary fluid from the absorber to the separator, which conduit line includes a pump, cooling means located in the boiler, cooling means located in the prime mover and a feed water heat exchanger.

6. A power plant which includes a steam turbine; a steam boiler and a steam generator for supplying steam to the turbine; a condenser evaporator receiving steam from the turbine; conduit lines which include a pump, for conducting the steam condensate from the condenser evaporator to the boiler and generator; an absorber for absorbing vapor from the condenser evaporator, the absorber being arranged in heat exchange relation with the steam boiler; a separator adapted to separate a binary fluid into its two constituent fluids; a conduit line, which includes a pump and pressure reducing means, for conducting liquid from the separator to the condenser evaporator; a conduit line, which includes a pump and pressure reducing means, for conducting liquid from the separator to the absorber; and equipment for conducting a binary fluid from the absorber to the separator, which equipment includes a pump and a cooling surface in the steam generator.

7. Equipment for transferring heat from the exhaust steam of a turbine to a steam boiler from which the turbine receives its steam, said boiler receiving heat from a binary fluid containing two constituent fluids; which includes means for conducting the steam condensate from the condenser evaporator back to the boiler; a separator for separating the binary fluid into its constituent fluids; a condenser evaporator for receiving the exhaust steam from the turbine and condensing the same; means for introducing the first constituent of the binary fluid into the condenser evaporator at low pressure; means for conducting the vapor of said constituent from the condenser evaporator to an absorber; means for conducting the second constituent of the binary fluid from the separator to the absorber and for reducing the pressure thereof; a vapor absorber for receiving the vapor and the second constituent fluid and for intimately mixing the same and causing the fluid to absorb the vapor; means, which include a heat absorbing surface in the absorber arranged in heat exchange relation with the boiler, for transferring heat from the absorber to the water in the boiler; and means for conducting the binary fluid formed in the absorber back to the separator including means for transferring heat from the absorber to the boiler.

8. That method of condensing exhaust steam from a steam prime mover and extracting heat from a fluid source external to the prime mover system, which includes the vaporization of the lighter element of a binary fluid by the absorption of heat from the exhaust steam and from the fluid source; the absorption of the vapor by the heavier element of the binary fluid and the transmission of "heat of absorption", thus released, to the steam boiler which furnishes steam for the prime mover.

9. A heat transfer system for transferring heat units from a warm fluid to a body of higher temperature than the warm fluid which includes; a heat absorber having a first compartment adapted to the circulation therethrough of the warm fluid and a second compartment adapted to receive, and permit the vaporization of, one constituent of a binary fluid; a vapor absorber and means for conducting vapor thereto from the heat absorber; a separator for separating a binary fluid into its two constituent fluids; means, including conduits, a pump and pressure reducing means, for conducting one constituent fluid from the separator to the heat absorber; means, including conduits, a pump and pressure reducing means, for conducting the other constituent fluid from the separator to the vapor absorber; means in the vapor absorber for causing an intimate mixture of the vapor and liquid entering the same; a heat absorbing surface in the vapor absorber for absorbing heat and means for conveying the heat absorbed thereby to the body of higher temperature and there releasing it; means for conveying binary fluid from the vapor absorber to the separator which includes conduits, a pump and a heating surface for releasing heat from the binary fluid to the said body of higher temperature.

10. Heat exchange apparatus for transferring heat from a first substance to a second substance of higher temperature than the first substance, which includes; a binary fluid containing a light and a heavy liquid, a mechanical separator for the binary fluid, an evaporator for the light liquid the evaporator being arranged in heat exchange relation with the first substance, an absorber for the light liquid evaporate the absorber being arranged in heat exchange relation with the second substance, means for conducting light liquid from the separator to the evaporator said means including a cooler for the liquid and pressure reducing means, means for conducting the light liquid evaporate from the evaporator to the absorber, means for conducting heavy liquid from the separator to the absorber said means including a pressure reducing device, and means for conducting binary fluid from the absorber to the separator said means including a cooler for the fluid and a pump.

RALPH C. ROE.